May 23, 1961   E. M. O'CONOR HONEY ET AL   2,984,869
IMPROVED METHOD OF PRODUCING MICRO POROUS SHEET
Filed April 27, 1959
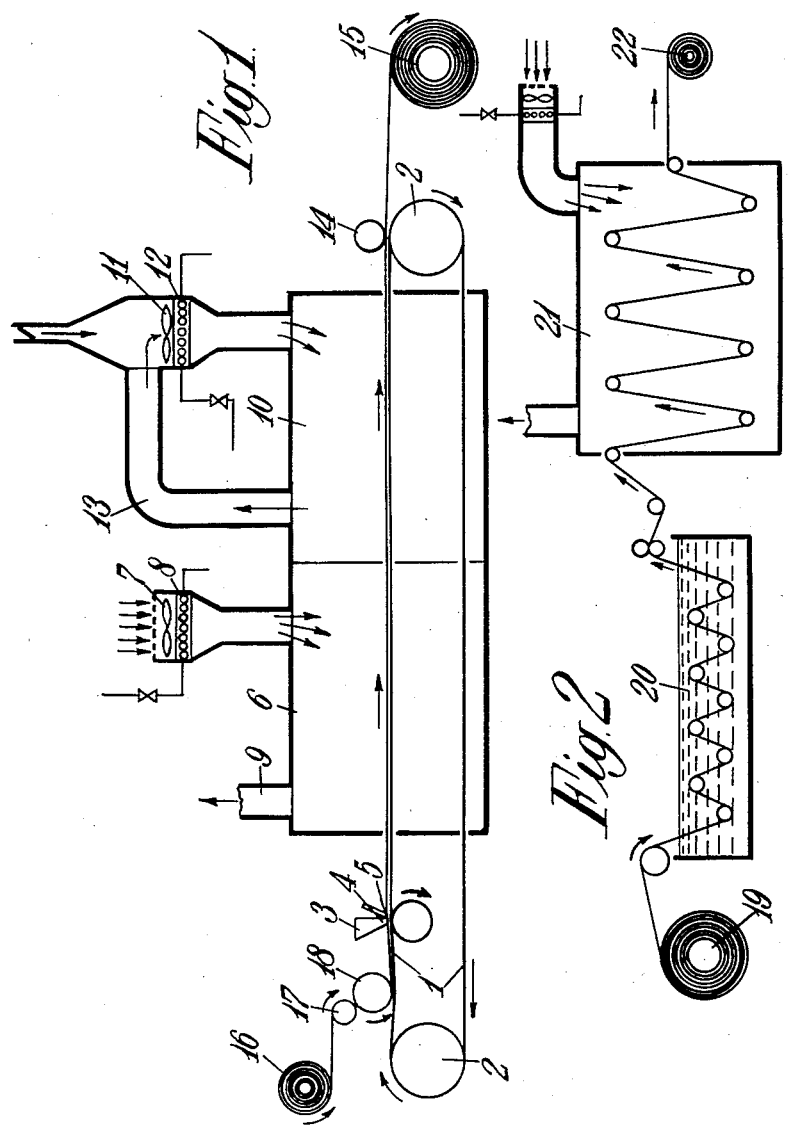
Inventors
E. M. O'C. Honey
C. R. Hardy
F. Sharp
By Gascoit Downing Seebold
Attys.

United States Patent Office 2,984,869
Patented May 23, 1961

2,984,869
IMPROVED METHOD OF PRODUCING MICRO-POROUS SHEET

Eric Maurice O'Conor Honey, Chigwell, Charles Rupert Hardy, South Woodford, London, and Frank Sharp, Gidea Park, Romford, England, assignors to Pritchett & Gold and E.P.S. Company Limited, Essex, England, a British company Filed Apr. 27, 1959, Ser. No. 809,174

Claims priority, application Great Britain May 2, 1958

3 Claims. (Cl. 18—48)

We have heretofore proposed to make micro-porous plastic sheet by incorporating a soluble removable filler into a plastic mass and sheeting the filled plastic, which consists essentially of a continuous phase of plastic gel with the removable filler as a discontinuous phase. We have proposed various techniques to break down the continuous plastic gel which encapsulates the filler particles so as to enable such filler to be dissolved and removed in order to produce the desired porous plastic sheet.

The object of the present invention is to produce a highly permeable micro-porous sheet comprising a synthetic resin from which the soluble filler has been removed without the necessity of subjecting the synthetic resin with the filler therein to a process for preventing encapsulation of the filler particles.

For the purpose of this invention a micro-porous sheet is one having a pore size of 10 microns or less when measured by the methods of British Standards Specification No. 1752, and where highly permeable is specified, this indicates a minimum permeability to water vapour of more than 500 gm./m.$^2$/24 hours when tested at 38° C. and with a relative humidity of 90% on one side of sheet with a dry atmosphere on the other side.

Where in this specification a synthetic resin or resin is referred to this denotes either polyvinyl chloride or a copolymer of vinyl chloride with an ethylene derivative which does not possess a marked solubility in the cold in the plasticisers used with the resin.

Our invention comprises the production of a highly permeable micro-porous plastic sheet from a synthetic resin powder, a plasticiser for the resin, a powdered water soluble pore forming material, and a volatile solvent for the plasticiser which has little or no solvent action on the resin, these being intimately mixed in the cold to form a cream of smooth workable consistency, the cream being then spread on a carrier and the volatile solvent removed by evaporation at a relatively low temperature, e.g. 90° C., after which the sheet is heated to an elevated temperature, e.g. 170° C. to cause the resin and plasticiser to form a gel, then cooled and the pore forming material leached out and the sheet dried.

The invention further comprises the production of a micro-porous plastic sheet as aforesaid in which the volatile solvent for the plasticiser is white spirit or solvent naphtha.

The invention further comprises the production of a micro-porous plastic sheet as aforesaid in which pore forming material is sodium chloride in amount not less than 150 and not more than 400 parts by weight to 100 parts by weight of synthetic resin. The invention further comprises the production of a porous plastic sheet as aforesaid which incorporates a permeable textile fabric on to which the cream is spread.

In one convenient application of the invention we use P.V.C. powder, a plasticiser for the P.V.C., powdered sodium chloride in amount at least equal to one and a half times the weight of the P.V.C. and of a suitable particle size, and intimately mix these together in the cold to form a cream, using a volatile solvent for the plasticiser (which has little or no solvent action on the P.V.C.) in amount sufficient to adjust the cream to a smooth, workable consistency. A suitable volatile solvent for the plasticiser is white spirit or solvent naphtha. The cream is allowed to stand for several hours or is subjected to reduced atmospheric pressure to remove any entrapped bubbles of air. It is then spread on to a carrier, for example, a stainless steel belt or a fabric, as a uniform layer of the desired thickness and the volatile solvent is removed by evaporation at a relatively low temperature, e.g. 90° C. approximately. The solvent-free sheet is then heated for several minutes at an elevated temperature of e.g. 170° C. approximately to cause the P.V.C. and plasticiser to form a gel. On cooling the sheet is stripped from the carrier if this has been used as a temporary support or it may be left on a carrier such as a fabric if this has been used as a permanent base. The sodium chloride is then leached out and the sheet dried. In our prior processes there are essentially two phases present in the mixture, a solid phase exclusively consisting of the filler or pore forming ingredient, and a liquid phase comprising the polyvinyl chloride. In the present process as described above, there are two solid phases. One of them is, as before, the pore forming ingredient, for instance sodium chloride. The other solid phase is the polyvinyl chloride, which instead of being hot mixed to form a gel with the plasticiser, as previously, now remains as a solid in the unheated cream. The liquid phase consists of a plasticiser and a volatile solvent for the plasticiser, but the volatile solvent for the plasticiser is so chosen as to exclude liquids which have any appreciable solvent action upon the polyvinyl chloride.

As the polyvinyl chloride exists as a solid, discontinuous phase, it cannot encapsulate the pore forming ingredient, which co-exists as a solid, discontinuous phase. After the cream, consisting of the two solid phases, and the third or liquid phase which is the plasticiser and its solvent, has been sheeted out, a comparatively low temperature is employed to evaporate the solvent. The solvent used, not being a solvent for the P.V.C. and insufficient heat being employed to cause the plasticiser to gel the P.V.C., the sheeted material still contains the two solid phases on completion of this solvent removal stage. The third or liquid phase now consists of the plasticiser alone. When the sheet is then heated to the gelling temperature, this third phase is absorbed by the particles of P.V.C. which are thereby caused to swell. There are now present two phases, one the pore forming ingredient in its original solid state, and the other consisting of plasticised P.V.C. It might be assumed that the presence of plasticised P.V.C. as a liquid phase at this stage might lead to some encapsulation of the pore forming ingredient in spite of the precautions taken earlier in the process to avoid it. But we find that our present process is relatively free from encapsulation because the gelling process is now unaccompanied by any mechanically applied movement of the particles. The earlier processes involved prolonged heated mixing to obtain homogeneity within the mix, as plasticised P.V.C. is far from being a mobile liquid. Our present gelling process, unaccompanied by mixing movements, can be regarded as merely the absorption of plasticiser by the P.V.C. particles with consequent swelling and partial coalescence of the particles of plasticised P.V.C.

If the plasticiser used has solvent power on the P.V.C. in the cold, it is desirable to employ a P.V.C. having its particles of fairly large size, say 100 microns diameter, or at least a proportion of fairly large size particles, in order to avoid loss of permeability in the finished product.

We may, as before stated, spread the cream on to a textile fabric which then becomes an integral part of the product during the solvent removal and gelling stages of the process and is fairly adherent to the plastic sheet throughout the remaining processes of leaching and drying and in the final product: by this means the invention may be used to produce synthetic materials combining the properties of strength, flexibility and permeability with micro-porosity.

When the present process is employed to make such a composite plastic fabric sheet, we have found that the permeability of the resulting sheet is influenced by the choice of fabric and that the greater the absorption by the fabric of the liquid phase from the cream, the greater the permeability. This effect is well illustrated by the following Table 1 in which a variety of fabrics are listed together with their absorbency for the liquid in the cream and corresponding permeability of the resulting micro-porous sheet to water vapour. These figures are compiled from tests carried out on the same mix and processed under identical conditions.

TABLE 1

| Type of Fabric | Absorbency, gm./75 cm.²/3 min. | Water Vapour Permeability gm./m.²/24 hrs. |
| --- | --- | --- |
| Woven Nylon | 0.28 | 1,100 |
| Woven Acetate | 0.30 | 1,700 |
| Bonded Acetate | 0.47 | 3,500 |
| Cotton Cambric | 0.54 | 4,600 |
| Cotton Haircord | 0.55 | 4,800 |
| Cotton Duck 1 | 0.59 | 4,800 |
| Cotton Duck 2 | 0.62 | 5,400 |

The textile fabric may, if desired, be in the form of a very open net, for example, a leno weave or knitted mesh, in which case it is carried on a temporary support such as a stainless steel belt so that when the cream is spread upon the net and penetrates the openings, the stainless steel belt supports the cream in position. This composite layer remains on the belt during the solvent removal and the gelling stages, after which it is stripped from the belt prior to leaching and drying. Using this variant of the process we obtain a micro-porous sheet in which the reinforcing net is buried, thus ensuring permanent keying of the fabric within the sheet, which is provided with two smooth plastic surfaces. The open mesh fabric has little effect on the permeability of the resulting composite plastic/fabric sheet.

In order to facilitate the mixing of the cream and its subsequent spreading, we prefer to use a resin powder having roughly spherical particles ranging in size between 0.2 micron and 1.5 microns although other particle sizes and shapes may be used either wholly or in part. Large particle size resins tend to yield an end product of greater permeability.

The effect of incorporating a proportion of larger particle size resin is shown in Table 2. These results were obtained for micro-porous plastic film carried on woven nylon and the same formulation was used throughout:

TABLE 2

| Percent Resin of particle size 0.2 to 1.5 micron | Percent Resin of particle size 150–200 micron | Water Vapour Permeability, gm./m.²/24 hr. |
| --- | --- | --- |
| 100 | 0 | 1,600 |
| 95 | 5 | 1,950 |
| 90 | 10 | 2,300 |
| 80 | 20 | 3,300 |

Any of the appropriate plasticisers for P.V.C. or P.V.C. polymers, including polymeric types such as polypropylene sebacate, may be used in the process of our invention, and in amount dictated by the mechanical properties required in the finished product, but it is possible to effect some control of the final permeability by choice of the type of plasticiser. The more active plasticisers, such as the monomeric esters, tend to give lower permeability than the less active polymeric plasticisers. This we attribute to the greater mobility of the plastic phase during the gelling operation when a more active plasticiser has been used, the greater mobility allowing the plasticised resin to spread and obscure a larger proportion of the potential pores.

The figures given in Table 3 for the water vapour permeability of a range of unsupported films in which polypropylene sebacate, di-capryl phthalate or mixtures thereof are used in the same formulation serve to illustrate this effect.

TABLE 3

| Percent Polypropylene sebacate | Percent Di-capryl phthalate | Water Vapour Permeability, gm./m.²/24 hr. |
| --- | --- | --- |
| 100 | ---------- | 3,500 |
| 80 | 20 | 1,900 |
| 50 | 50 | 1,600 |
| 20 | 80 | 500 |
| ---------- | 100 | 350 |

The particle size of the soluble filler should lie between 5 and 80 microns and should be chosen to suit the thickness of the sheet being made. Pores resulting from the use of such particle sizes are not visible to the naked eye. For sheets of 1 mil to 5 mils in thickness a particle size of 5 microns to 10 microns may be used, but for sheets of 6 mils thickness and upwards we have found that particles within the range of 10 microns to 80 microns are the most suitable, and particles of this size will produce pores in the final material not greater than 10 microns in diameter. It is advantageous for the particles to be as uniform as possible in size for when this is so the configuration when packed affords the greatest possible space for the plasticised resin network, thus favouring the production of strong materials of high permeability. This desirable uniformity of particle size may be substantially achieved by spray drying an aqueous solution or by careful grinding followed by air classification and screening. To meet the requirements of the present invention, the particles should be able to pass through a 200 mesh screen. The quantity of soluble filler used in the formulation exercises a major control on the permeability of the product and since a high permeability is usually required it is unusual to use less than 150 parts by weight of soluble filler to 100 parts by weight of resin when sodium chloride is employed, whilst the upper limit is usually not greater than 400 parts of soluble filler to 100 parts of resin since higher proportions than this unduly reduce the strength of the finished product.

When it is desired to obtain a micro-porous sheet having good mechanical strength we do this by combining a micro-porous film with a textile fabric in the manner previously described. Practically all types of fabric can be used in our process, thereby making it possible to combine the properties of the chosen fabric with those of a micro-porous plastic sheet. The type of fabric selected for making a composite plastic/fabric sheet will be governed by the end-use for which the sheet is required. The range of fabrics available includes those made from natural regenerated or wholly synthetic fibres and of a woven, knitted or bonded-fibre construction. The composite sheeting may be either extensible or non-extensible depending on the nature of the fabric and upon the formulation of the plastic component. Such a composite sheet overcomes the lack of mechanical strength, particularly of tear strength, which characterises a non-reinforced micro-porous sheet.

By the process of our invention we obtain a wide variety of micro-porous, highly permeable sheeting, both unsupported and supported upon a fabric base. The size of the pores is such that penetration by aqueous liquids is almost impossible, having regard to the natural water-repellency of the plastic material from which the micro-porous material is made. The high permeability, however, allows the free passage of air and gaseous liquids such as water vapour. These features of the repellency to aqueous liquids and permeability to water vapour render our products well suited to a range of uses which include upholstery and clothing.

Referring to the accompanying explanatory drawings:

Figure 1 shows the first portion of a plant for producing one form of our improved plastic sheeting.

Figure 2 shows the second or final portion of such a plant in which the processing of the plastic sheeting is completed.

In Figure 1 an endless stainless steel belt 1 is carried on drums 2. A hopper 3 contains a mix 4 and a doctor blade 5 is adjusted to cause a uniform layer mix 4 to be spread upon the stainless steel belt 1. The material having been spread upon the belt, it is then carried through the solvent removal oven 6, which is provided with a fan 7 and heater bank 8. An outlet duct 9 is provided to take the solvent laden air to a solvent recovery plant. After the material has passed through the solvent removal oven 6 it then enters a gelling oven 10, which is provided with a fan 11 and a heater bank 12. As there is little, if any, evolution of volatile matter, the outlet duct 13 is connected to the fan 11 for air re-circulation purposes. After the material has passed through the gelling oven, it is cooled by contact with a water-cooled roll 14 and is then stripped off the stainless steel belt. It may conveniently be collected as a roll 15.

If it is desired to incorporate fabric reinforcement, the reinforcing fabric is fed off a roll 16 over a tensioning roll 17 and beneath a pressure roll 18. Thus the fabric is in position upon the stainless belt 1 before the paste 4 is spread upon it.

When fabric reinforcement is used, it is possible to dispense with the stainless steel belt 1 and employ the reinforcing fabric as a carrier.

Figure 2 shows the material 19 being passed through a leaching tank 20 containing warm water to remove the soluble pore forming ingredient and then through a drying oven 21 to remove the water. Finally, the microporous material is collected as a roll 22.

*Example 1*

We mix together in the cold 100 parts of P.V.C. of particle size 0.2 to 1.5 microns, 150 parts of sodium chloride of particle size 10 to 80 microns, 60 parts of polypropylene sebacate, 8 parts of a suitable stabiliser such as epoxidised oil, 65 parts of solvent naphtha and one part of pigment. The whole of the mix is passed through a triple roll mill in order to ensure good dispersion of all the ingredients, from which it is collected as a smooth cream possessing good flow properties for spreading. The cream is allowed to stand for several hours or is placed in reduced pressure, to allow the escape of any entrapped bubbles of air. It is then ready for spreading which is done under a doctor blade upon a stainless steel belt to a thickness of 0.010″. The material travels forward with the belt into a solvent removal oven maintained at a temperature of 90° C. to evaporate solvent naphtha. Following this, it enters the gelling oven which is maintained at 175° C., whereupon the P.V.C. is gelled by the plasticiser. On emerging from the gelling oven the sheet is stripped from the belt and is passed into water to leach out the sodium chloride, after which it is dried at approximately 60° C. If the stainless steel belt has a highly polished surface the surface of the plastic sheet in contact with it develops a highly glazed, dirt-resisting surface which is not affected by the subsequent leaching and drying processes, resulting in a finished sheet which also possesses this desirable glazed surface.

The final end-product has a water vapour permeability of 1460 gm./m.²/24 hr. and a pore size of 1.3 microns.

*Example 2*

| | Parts |
|---|---|
| P.V.C. (0.2 to 1.5 microns) | 100 |
| Sodium chloride (10 to 80 microns) | 250 |
| Polypropylene sebacate | 56 |
| Di-capryl phthalate | 14 |
| Stabiliser | 8 |
| Solvent naphtha | 14 |
| Pigment | 1 |

The processing details are similar to those described in Example 1.

The end-product has a water vapour permeability of 1900 gm./m.²/24 hr. and an effective pore size of 10 microns.

*Example 3*

| | Parts |
|---|---|
| P.V.C. (0.2 to 1.5 microns) | 100 |
| Sodium chloride (10 to 80 microns) | 370 |
| Trixylenyl phosphate | 70 |
| Stabiliser | 8 |
| Solvent naphtha | 27 |
| Pigment | 1.6 |

The mixture or cream is made as described in Example 1, and is spread to a depth of 0.020″ upon a woven cotton fabric. The subsequent processing is as described in Example 1.

The end-product has a water vapour permeability of 3120/gm./m²/24 hr. and an effective pore size of 2.4 microns.

*Example 4*

| | Parts |
|---|---|
| P.V.C. (0.2 to 1.5 microns) | 60 |
| P.V.C. (10 to 100 microns) | 40 |
| Sodium chloride (10 to 80 microns) | 300 |
| Di-capryl phthalate | 60 |
| Stabiliser | 8 |
| Solvent naphtha | 45 |
| Pigment | 1 |

The cream is spread to a depth of 0.030″ upon a knitted Terylene mesh supported on a stainless steel belt. After processing as before, the end product had a water vapour permeability of 2400 gm./m.²/24 hr. and an effective pore size of 1.4 microns.

In the description of the process and in the examples we have referred to polyvinyl chloride as the synthetic resin. Our process can, however, as before stated, be applied to a resin consisting of a copolymer of vinyl chloride with an ethylene derivative such as vinyl acetate which does not possess marked solubility in the cold in the plasticisers used in a particular formulation, as this solubility tends to reduce the permeability of the end-product. No difficulty would generally arise in formulations employing polymeric plasticisers, however, and it is possible to substitute for the polyvinyl chloride in Example 1 a copolymer of vinyl chloride containing 5% of vinyl acetate. A slight increase in flexibility occurs in the end-product with little or no diminution in the water vapour permeability.

Our improved product may be used for numerous services including wearing apparel, such as rainwear, protective clothing, shoe socks and linings and upholstery.

We claim:

1. The production of a micro-porous plastic sheet comprising mixing together P.V.C. powder containing particles of up to 150 microns diameter, a plasticizer for the P.V.C., powdered sodium chloride in amount at least equal to one and a half times the weight of the P.V.C., the particle size of the sodium chloride for a sheet of 1 mil to 5 mils in thickness being 5 to 10 microns and for a sheet of 6 mils thickness and upwards of 10 to 80 microns, and a volatile solvent of the group consisting of white spirit and solvent naphthal for the plasticizer, whereby a cream of smooth workable consistency is produced, removing entrapped air from the cream, spreading said cream on an endless travelling belt, removing the solvent from the cream by evaporation at a temperature below gelation, heating the solvent free sheet so formed for several minutes at a temperature of about 170° C. to cause the P.V.C. and plasticizer to gel, cooling the sheet, removing it from the belt, leaching the sodium chloride from the sheet, and drying the sheet.

2. In the production of a micro-porous plastic sheet as claimed in claim 1, spreading the cream on to a travelling permeable fabric supported by the endless travelling belt.

3. In the production of a micro-porous plastic sheet as claimed in claim 1, spreading the cream on to a stainless steel belt.

References Cited in the file of this patent

UNITED STATES PATENTS 2,806,256 Smith-Johannsen _____ Sept. 17, 1957

FOREIGN PATENTS 521,527 Belgium _____ Aug. 14, 1953
766,139 Great Britain _____ Jan. 16, 1957
244,901 Switzerland _____ July 16, 1947

OTHER REFERENCES

Society of the Plastic Industry (SPI) paper, Dec. 1951, publ. by John Waldron Corp. New Brunswick, N.J.

Organic Finishing, Dispersion Coatings, Dec. 1950, pp. 11–15.

Modern Plastics, Dispersion Coatings, Dec. 1950, pp. 11–15.

Modern Plastics Encyclopedia and Engineer's Handbook, 1950, pages 1057–1059: see "Plastics Properties Chart," and "Plastics Films Chart."